Jan. 31, 1967    P. PRAKASH    3,301,094
METHOD AND MEANS FOR CONVERSION OF TORQUE FROM PRIME MOVERS
Filed Nov. 8, 1963    2 Sheets-Sheet 1
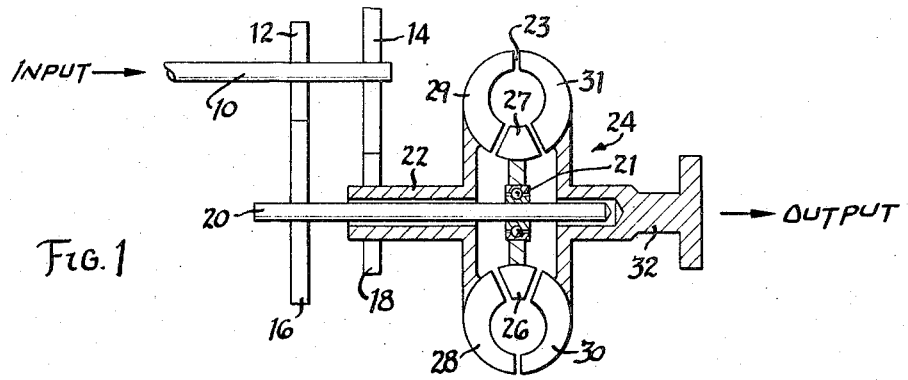
FIG. 1
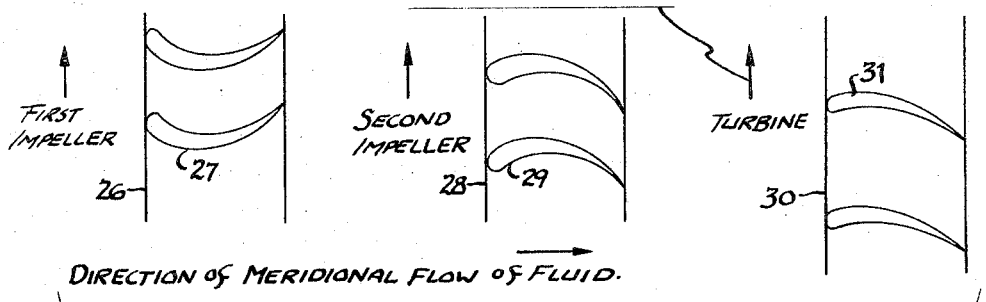
FIG. 2
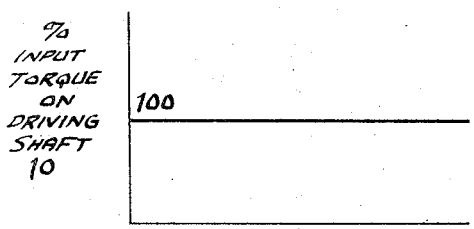
FIG. 3-a
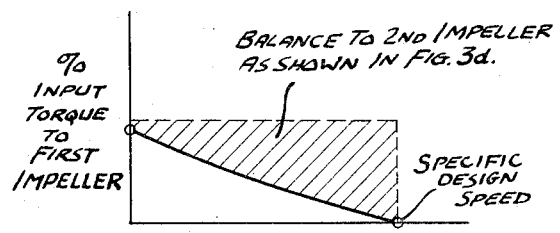
FIG. 3-b
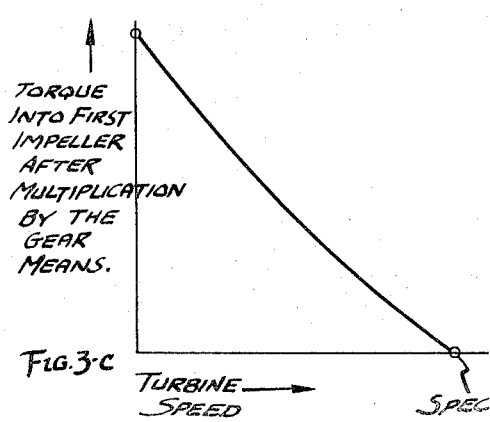
FIG. 3-c
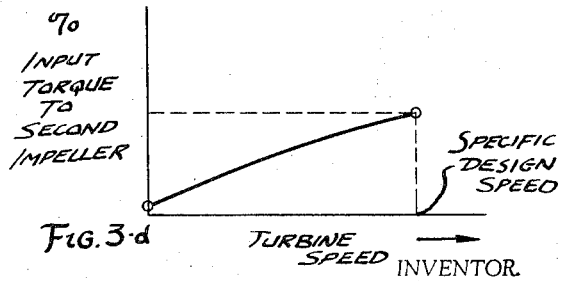
FIG. 3-d
INVENTOR.
PREM PRAKASH
BY
WILSON, SETTLE & CRAIG
ATTORNEYS

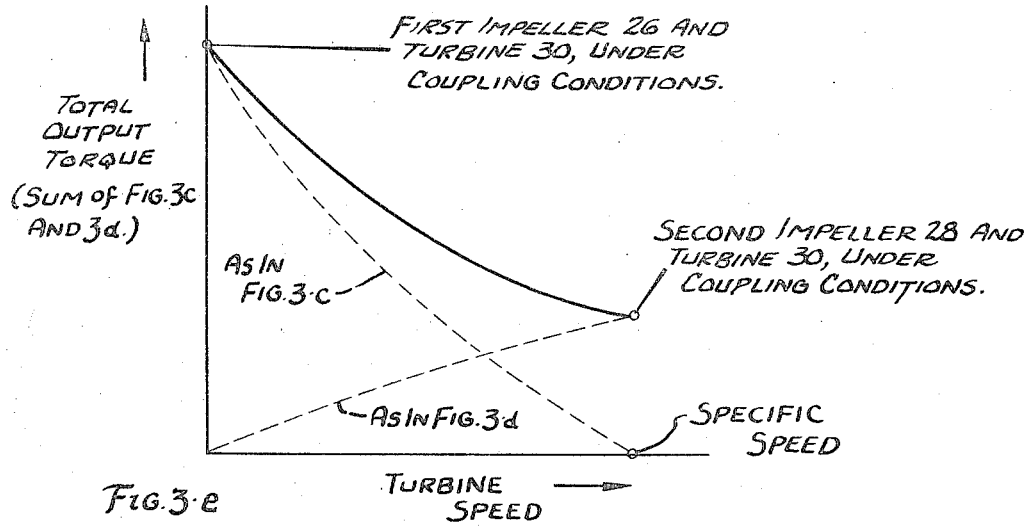
Fig. 3-e
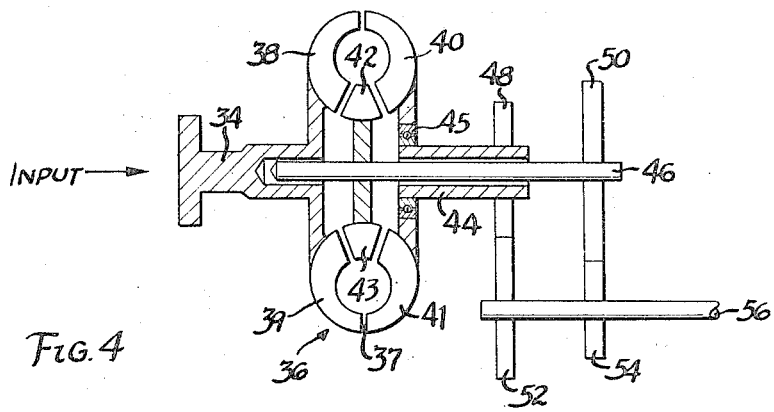
Fig. 4
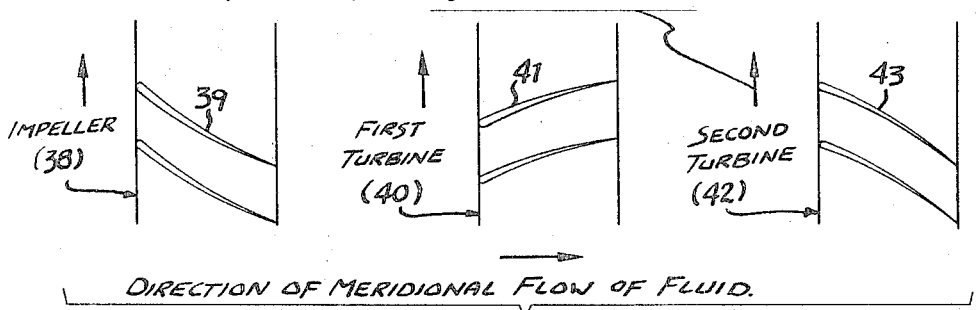
Fig. 5

United States Patent Office 3,301,094
Patented Jan. 31, 1967

3,301,094
METHOD AND MEANS FOR CONVERSION OF TORQUE FROM PRIME MOVERS
Prem Prakash, 1561 Nott St., Schenectady, N.Y. 12309
Filed Nov. 8, 1963, Ser. No. 322,410
6 Claims. (Cl. 74—718)

This invention relates to transmissions and more particularly to a torque converting and transmitting device capable of exerting on a driven shaft, a continuously variable torque, and for use with prime movers, particularly those having a substantially constant torque output at various speeds such as is involved in the operation of internal combustion engines.

The application is a continuation-in-part of my co-pending application Serial No. 178,421 filed March 8, 1962 which will issue as United States Letters Patent No. 3,110,197 on November 12, 1963.

An object of my invention is to provide an improved transmission wherein the torque on the input or driving shaft is split into at least two paths, and the portions of torques exerted through both of the split torque paths are multiplied by torque increasing mechanisms having unequal but constant torque increasing ratios, and wherein the so differently multiplied split torques are then exerted simultaneously on the output or driven shaft.

A further object of my invention is to provide at least a two path power flow transmission wherein to exert continuously variable torque on the output shaft, the proportions of the split torques passing through the two paths get varied hydrodynamically to an extent proportionate to the speed of the output shaft.

Another object is to provide a transmission so constructed and arranged that when the driven shaft is stationary, the major portion of the torque is directed to flow through the torque path having the higher torque multiplication, thus providing a high output torque, and that when the driven shaft is rotating at a specific speed substantially all the torque is directed to flow through the torque path having the lower torque multiplication, thus providing a low output torque, and operable in such a manner that as the speed of the driven shaft increases the proportion of the torque flowing through the path having the higher multiplication factor gradually decreases while the proportion of torque flowing through the path having the lower multiplication factor correspondingly increases, the sum of the multiplied split torques being exerted on the driven shaft.

Still another object of my invention is to provide an improved transmission wherein a continuously variable torque multiplication is obtained between the initial high output torque and the final low output torque.

Other objects of this invention will appear in the following description and appended claims, reference being had to the accompanying drawings forming a part of this specification wherein like reference characters designate corresponding parts in the several views.

In the drawings:

FIGURE 1 is a longitudinal sectional view of a transmission wherein mechanical gear means arranged to split the input torque and multiply each of them though different ratios are interposed, between a driving shaft and two independently operable impeller members which also serve to vary the torque on each of the two paths depending on the speed of the driven shaft, and wherein the sum of the so multiplied torques is exerted hydrodynamically to the turbine and driven shaft.

FIGURE 2 is a series of elevational views illustrating one form of blade profiles for use in the embodiment of the invention shown in FIGURE 1, the actual profile being designed and proportioned to conform to the equations embodied in the specification.

FIGURES 3a to 3e are a series of curves explaining and illustrating the operating characteristics of the embodiment of my invention shown in FIGURE 1.

FIGURE 4 illustrates a modified form of my invention in which two independently operable turbines are employed to split the torque into two paths hydrodynamically and also to vary the torque on each of the two paths depending on the speed of the driven shaft, and wherein mechanical gearing is interposed between each of the turbine members and the driven shafts to multiply each of the torques through different ratios and then apply them simultaneously on the driven shaft.

FIGURE 5 is a series of elevational views illustrating the blade profiles of the embodiment of my invention of FIGURE 4, the actual profile being designed and proportioned to conform to the equations embodied in the specification.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to understood that the phraseology or terminology employed herein is for the purpose of description and not of limitation.

Referring now to the embodiment illustrated in FIGURE 1 it will be noted that my improved transmission includes a driving shaft 10, a driven shaft 32 and a hydrodynamic device 24. The hydrodynamic device 24 has two fluid energizing bladed members such as a first impeller member 26 and a second impeller member 28. The device 24 also has an energy absorbing bladed member such for example as a turbine 30 secured to the driven shaft 32. These three bladed members are provided with a plurality of spaced contoured blades 27, 29 and 31 respectively. It is to be mentioned that the terms first and second impellers have been used only to designate these bladed wheels and not to indicate the sequence of their arrangement in the circuit.

The turbine 30, and the first and second impeller members 26 and 28 cooperate to form a torroidal chamber 23 which provides a single power transmitting circuit for the reception of working fluid.

On the input or driving shaft 10 are mounted two spaced driving gears 12 and 14 meshing respectively with gears 16 and 18. Gear 16 is secured to a first auxiliary shaft 20 and the gear 18 is secured to a second auxiliary shaft 22.

The first impeller member 26 is drivably connected to the first auxiliary shaft 20, and the second impeller 28 is fixed to the second auxiliary shaft 22. A freewheeling device 21 may be interposed between the first impeller member 26 and the first auxiliary shaft 20 to permit the impeller 26 to overrun the auxiliary shaft 20 under certain conditions of operation as hereinafter more fully described.

The gear pair 12–16 drivably connected to the first impeller 26 provides a high multiplication of torque from driving shaft 10 to the auxiliary shaft 20, the torque multiplication of this pair of gears being greater than the torque multiplication of the pair of gear pair 14–18 drivingly connecting the driving shaft 10 to the second impeller 28.

The design of the contoured blades 31 of the turbine 30, and the contoured blades 27 and 29 of the first impeller 26 and the second impeller 28 illustrated in FIGURE 2 conforms to the following equations:

(1) When the turbine 30 and the driven shaft 32 are stationary, the design is defined by the following equation:

$$\Delta Am_{26} = 0 \quad \Delta Am_{28} \approx 0 \quad \Delta Am_{30} < 0$$

(2) When the turbine 30 and the driven shaft 32 are rotating at a specific speed which is nearly equal to the speed of the second impeller 28 and the second auxiliary shaft 22, the relation is expressed by the following equation:

$$\Delta A m_{26} = 0 \quad \Delta A m_{28} > 0 \quad \Delta A m_{30} < 0$$

In the above equations:

$\Delta A m_{26}$ = change of angular momentum of the working fluid in its passage from the entrance of the blades of the first impeller 26 to their exit.

$\Delta A m_{28}$ = change of angular momentum of the working fluid in its passage from the entrance of the blades of the second impeller 28 to their exit.

$\Delta A m_{30}$ = change of angular momentum of the working fluid in its passage from the entrance of the blades of the turbine 30 to their exit.

Sign convention: with $+ve$ direction of rotation, if $\Delta Am$ is $+ve$, the blade wheel imparts energy to the fluid, and if $\Delta Am$ is $-ve$ it absorbs energy from the fluid.

It may be noted that $\Delta Am$ is influenced by a number of factors including the blade angles, the inlet and exit radii, the rate of circulation of power transmitting fluid, and the relative speed of rotation of various blade wheels in the circuit.

It is to be recognized that instead of calculating the disclosed design of the blades by using Euler's equations for turbo-hydraulic wheels, corresponding equivalents in the aerodynamic method of calculating the blade profiles may be used.

According to Euler's equations, this may be written as:

$$\Delta A m_{26} = \frac{QY}{g}(R_2 V_2 - R_1 V_1) \text{ per unit time}$$

where $Q$ = volume rate of flow of fluid per unit time
$Y$ = specific gravity
$R_2$ = exit radius
$V_2$ = exit peripheral velocity
$R_1$ = inlet radius
$V_1$ = inlet peripheral velocity
$g$ = gravitational constant Developing still further, for example:

$$V_2 = \{V_{r2} \cdot \cos \theta_2 + R \cdot \omega_{26}\}$$

where $V_{r2}$ = exit velocity of the fluid relative to the blade
$\theta_2$ = blade exit angle measured from the peripheral direction of rotation
$\omega_{26}$ = rotational blade velocity A similar expression can be written for $V_1$. The only difference will be that the suffixes will change to 1 (meaning inlet condition). Substituting the values of $V_2$ and $V_1$ in the original expression for $Am_{26}$, we get:

$$\Delta A m_{26} = \frac{QY}{g}\{R_2 \cdot V_{r2} \cdot \cos \theta_2 + R_2^2 \cdot \omega_{26} - R_1 \cdot V_{r1} \cdot \cos \theta_1 - R_1^2 \cdot \omega_{26}\}$$

Also similar expressions can be developed for $\Delta A m_{28}$ and $\Delta A m_{30}$. The solution of the following simultaneous equations can then be easily found by the use of a computer:

(a) Three equations for condition I when the turbine 30 and driven shaft 32 are stationary.

(b) Three equations for condition II when the turbine 30 and the driven shaft 32 are rotating at a specific speed which is nearly equal to the speed of the second impeller 28 and the second auxiliary shaft 22.

The above equations, it will be noted, contain as variables the values of inlet and outlet radii, inlet and outlet blade angles and rotational velocity of each blade member. The actual value of these variables will depend on the volume rate of fluid flow, specific gravity of the fluid and the gear ratios. These quantities in turn will depend upon the particular application for which the designer would previously have decided upon the type of fluid which he intends to use, the horsepower he wants to transmit and the starting torque multiplication he considers desirable.

It will be appreciated, therefore, that the actual values of various constructional features depend upon the desired application. The general conditions of design are thus disclosed rather than to state any specific values.

The important significance of the above stated design will now be discussed. Assume that the driven shaft 32 and the turbine 30 are stationary. When the driving shaft 10 rotates, the impellers 26 and 28 rotate at fixed speed ratios depending on the ratios of the gear sets 12–16 and 14–18. The rotation of the impellers 26 and 28 imparts movement to the working fluid, forcing it to circulate in a vortex motion in the toroidal chamber 23 formed by the bladed members 26, 28 and 30.

Because of the novel method of design of the blades since when the turbine 30 is stationary, the fluid angular momentum is affected only minimally by the second impeller 28 (see set of Equation 1 above), the said second impeller imparts little or no energy to the working fluid even though it is rotating in the generated fluid vortex. The second impeller is defined to have been designed at "runaway" condition.

During this stage of operation while the turbine 30 is stationary, the blade member which is primarily effective in inducing the vortex circulation of the fluid is the first impeller 26. A driving torque substantially equal to that of the first impeller 26 is transmitted by the fluid to the turbine 30. The hydrodynamic device 24 therefore functions in much the same manner as a fluid coupling, the first impeller 26 and the turbine 30 cofunctioning to transmit virtually all of the torque to the driven shaft 32. The torque "conversion" or multiplication at this stage is largely due to the multiplying effect of the gear pair 12–16.

When the turbine 30 and driven shaft 32 accelerate, the condition of the vortex circulation of the fluid changes, so that the first impeller 26 becomes less effective, and the second impeller 28 correspondingly becomes more operative due to the particular design of the blades 27 and 29 as illustrated in FIGURE 2, and specified in the design equations mentioned above.

The first impeller 26 thus becomes progressively less effective, and the second impeller 28 becomes increasingly effective due to the hydrodynamic characteristic inherent in the specific design of my improved transmission. During this phase the driving torque is being transmitted both by the first and second impellers 26 and 28 and the torque on the turbine 30 and driven shaft 32 is the instantaneous sum of the torque load on the first impeller 26 and the second impeller 28.

From a study of the second set of design conditions it will be apparent that when the turbine 30 and the output shaft 32 have accelerated to be rotating at the specific design speed which is substantially equal to the speed of the second impeller 28, the first impeller 26 becomes completely ineffective, even though rotating at the geared speed as governed by the gear pair 12–16. This condition is referred to herein as the runaway condition of the first impeller. A driving torque substantially equal to that of the second impeller 28 is transmitted to the turbine 30 and the driving shaft 32. The hydrodynamic device functions once again in much the same manner as a fluid coupling with the second impeller 28 and the turbine 30 cofunctioning to transmit all the torque to the driven shaft 32.

Attention is invited to the fact that in my improved transmission the first impeller 26 becomes ineffective depending on the speed of the turbine 30 relative to the second impeller 28.

The operation of the device will now be explained with reference to the curves of FIGURES 3, a, b, c, d and e in which the torque loading of the important parts of my improved transmission are illustrated. In all of the curves the speed of the turbine 30 is shown as the base, and the torque loading is shown as a percentage of the torque on driving shaft 10.

It will be noted that:

(1) FIGURE 3a—the torque on the driving shaft 10 remains 100% for all speeds of the turbine.

(2) FIGURE 3b—the part of the driving torque passing to the first impeller is approximately 100% when the turbine 30 is stationary. This gradually reduces to 0% when the turbine 30 reaches the specific speed, because the said first impeller is designed to be at its runaway point at this stage of operation.

(3) FIGURE 3c—the proportion of the driving torque passing to the first impeller 26, is multiplied by the gear train 12–16 before being actually imparted to the impeller.

(4) FIGURE 3d—while the turbine 30 is stationary, the part of the driving torque passing to the second impeller 28, is approximately 0% because in accordance with the first design condition the fluid is subjected to very little change in the angular momentum in its passage through the second impeller 28 at this stage of operation. The torque gradually increases to 100% when the turbine 30 reaches the specific speed. (For the sake of illustration it is assumed that this torque is not multiplied by the gears 14–18, though it may be arranged with multiplication which as already disclosed before, must be less than the multiplication in the path of the drive to the first impeller 26.)

(5) FIGURE 3e—the torque exerted on the turbine 30 is the sum of the torques exerted on the first impeller 26 and the second impeller 28. It is to be noted that when the turbine 30 is stationary, the first impeller 26 and the turbine 30 function essentially as a fluid coupling. Also when the turbine 30 is running at a specific speed, the turbine 30 and the second impeller 28 are functioning essentially under coupling conditions.

If the first impeller 26 is mounted on the auxiliary shaft 20 through the freewheeling device 21, then after the turbine 30 exceeds the specific designed speed, the first impeller 26 will start overrunning the auxiliary shaft 20 at its natural runaway speed under the resulting fluid vortex condition, and will neither impart any energy to the power transmitting circulating fluid nor absorb any driving torque. The hydrodynamic device will thus continue to work under coupling conditions between the second impeller 28 and turbine 30.

It is believed that the following explanation of the working principle by way of illustration with assumed values will be helpful to a clearer understanding of my invention:

|  | Multiplication Factor | Final Torque after Multiplication |
| --- | --- | --- |
| Driving torque=100 | | |
| Torque into first impeller 26 (i.e. the path with higher multiplication factor)=P | 2 (assume) | 2×P. |
| Torque into second impeller (i.e. in path with lower multiplication factor by difference)=(100−P) | ½ (assume) | ½ (100−P). |
| Final torque on driven shaft (by addition) | | =2×P+½ (100−P) or =1.5 P+50. |

It is to be seen that even though the gear ratios provided in the two paths of the transmission are constant, a continuous variation of the torque exerted on the driven shaft is obtained when the proportion of torque P passing through the higher torque multiplication path varies as illustrated below:

|  | Designed Value of Proportion P | Torque on Driving Shaft=(1.5P+50) |
| --- | --- | --- |
| 1. Driven shaft stationary | P=100 | T output ≃200. |
| 2. Driven shaft increasing in speed. | P reducing from 100 to 0. | T output, reducing from 200 to 50 gradually. |
| 3. Driven shaft at specific speed design speed. | P=0 | T output=50. |

A second embodiment of the invention as illustrated in FIGURES 4 and 5 which will now be described in detail for construction, design and operation.

Referring to FIGURE 4, it will be noted that this embodiment of my improved transmission includes a driving shaft 34 and a driven shaft 56 with a hydrodynamic device 36 interposed therebetween. The hydrodynamic device 36 has three bladed members including a single impeller 38, a first turbine 40 and a second turbine 42. It is to be noted that the terms first and second turbines have been used only to designate the two turbines and not to indicate the sequence of their arrangement in the circuit. These three bladed members 38, 40 and 42 are provided with a plurality of spaced contoured blades 39, 41 and 43 as illustrated in FIGURE 5.

The impeller 38 and the first and second turbine members 40 and 42 cooperate to form a torroidal chamber 37 which contains in a single power transmitting circuit the working fluid which is energized by the impeller and imparts energy to the turbine members.

On the output shaft 56 are mounted two gears 52 and 54 meshing respectively with gear wheels 48 and 50. Gear wheel 48 is fixed to the first auxiliary shaft 44 and the gear wheel 50 is fixed to the second auxiliary shaft 46.

The first turbine 40 is drivingly connected to the first auxiliary shaft 44, and the second turbine 42 is drivingly connected to the second auxiliary shaft 46 and the impeller 38 is drivingly connected to the input shaft 34. A freewheeling device 45 in the form of an overrunning clutch may be interposed between the first turbine 40 and the first auxiliary shaft 44 to permit the shaft 44 to overrun the first turbine 40.

The gear pair 48–52, drivingly connecting the first turbine 40 to the driven shaft 56, provides a relatively high multiplication of the torque from the auxiliary shaft 44 to the driven shaft 56 as compared to the gear pair 50–54 drivingly connecting the second turbine 42 to the driven shaft 56.

The design of the contoured blades 39 of the impeller 38, and of the blades 41 and 43 of the first and second turbine members 40 and 42 illustrated in FIGURE 5 conforms to the following equations:

(1) When the driven shaft 56 and the first and second turbines 40 and 42 are stationary:

$$\Delta Am_{40} < 0 \quad \Delta Am_{42} \cong 0 \quad \Delta Am_{38} > 0$$

(2) When the second turbine 42 is rotating at a specific speed, which speed is nearly equal to the speed of the impeller 38:

$$\Delta Am_{40} = 0 \quad \Delta Am_{42} < 0 \quad \Delta Am_{38} > 0$$

In the above equations the significance of the symbols and the sign convention is the same as already mentioned. Only the suffixes have been changed to represent the blade wheels of the FIGURE 4 embodiment of my invention to which they refer.

It may be noted that $\Delta Am$ as mentioned before is influenced by many factors including the blade angles and the inlet and exit radii of the blades, the rate of circulation of the fluid, and the relative speed of rotation of various blade wheels in the circuit. It may again be mentioned that instead of calculating the blade designs by using Euler's equation for turbo-hydraulic wheels corresponding equivalents in the aerodynamic method of calculating blade profiles may be used.

As before, assuming, to start off the driven shaft 56 and the turbine wheels 40 and 42 are stationary, when the driving shaft 34 and the impeller 38 start rotating, the impeller 38 causes the working fluid to flow into a vortex circulation in the toroidal chamber 37 formed by the bladed members 38, 40 and 42.

At this stage, when the output shaft is stationary because of the disclosed method of design of the blades, the fluid angular momentum is affected minimally by the second turbine 42. As such it does not receive any significant amount of torque loading even through it is in the fluid circuit. The second turbine is defined to have been designed at "runaway" condition. The first turbine 40 receives most of the torque loading. The hydrodynamic device therefore functions in much the same manner as a fluid coupling with the impeller 38 and the first turbine 40 cofunctioning to transmit all of the torque.

When the driven shaft 56 picks up speed both the turbines 40 and 42 start rotating. As such the condition of the fluid vortex circulation changes. Consequently the driving torque during this phase is shared by both the turbine to a varying extent depending on the speed of the output shaft 56 relative to the speed of the input shaft.

When the second turbine 42 reaches a specific speed which is approximately equal to the speed of the impeller 38, due to the disclosed method of design the first turbine 40 does not impart any change to the fluid angular momentum even though it is rotating in the fluid vortex at a speed decided by the gear pair 48–52. It is thus defined to have been designed at its runaway condition at this stage. The only blade members effective at this stage are the impeller 38 and the second turbine 42. The driving torque is therefore transmitted from the impeller 38 to the second turbine 42 without any substantial change. The device thus functions in much the same way as a coupling with the impeller 38 and the second turbine 42 being operable.

The operation of the device is therefore seen to be as follows:

(i) The torque on the driving shaft and therefore the impeller 38 remains 100% for all speeds of the driven shaft 56.

(ii) The part of the driving torque passing through the first turbine 40 is approximately 100% when the driven shaft 56 is stationary. This gradually reduces to 0% when the second turbine 42 reaches the specific speed because at this stage the fluid flows through the blades of the turbine 40 without suffering any change in angular momentum.

(iii) This torque on the first turbine 40 is transmitted through the gear pair 48–52 to the driven shaft 56 with a corresponding torque multiplication.

(iv) Also, when the driven shaft 56 is stationary the part of the driving torque passing to the second impeller 42 is approximately 0% because in accordance with the first design condition, the fluid suffers a minimal change in the angular momentum in its passage through the blades of the second turbine 42 at this stage of operation. The portion of driving torque passing to the second turbine 42 gradually increases as its speed increases and becomes 100% as the speed of the second turbine 42 reaches the specific design speed. The torque exerted by the second turbine 42 is transmitted by the gears 50–54 to the driven shaft 56 with a corresponding torque multiplication, which multiplication is however less than that effected by the gear pair 48–52.

(v) The torque transmitted to the driven shaft 56 is the sum of the duly multiplied torques from the first and second turbines 40 and 42 respectively. The overall result is a continuously variable output torque.

If the first turbine 40 is mounted on its auxiliary shaft 44 through a freewheel device 45, then after the second turbine 42 exceeds the said specific speed, the first turbine 40 will start lagging behind the auxiliary shaft at its own natural runaway speed under the fluid vortex condition then existing, and will permit the auxiliary shaft 44 to overrun it thus not absorbing any torque loading. The hydrodynamic device will thus continue to work under coupling conditions between the impeller 38 and the second turbine 40.

Having thus described my invention, I claim:

1. In a continuously variable torque converting transmission, a power transmitting fluid device including first, second and third rotatable bladed members, the first bladed member being geared to at least one of the other two members so as to rotate at a speed different from that of the second and third bladed members, the second bladed member being a fluid energizing impeller member and the third bladed member being an energy absorbing turbine member, the three bladed members cooperating together to form a torroidal chamber providing a single circuit for a working fluid and each of the three bladed members having a plurality of blades so designed and proportioned that when the third member rotates at a specific speed ratio with respect to the impeller member such that the speed of the said third bladed member is approximately equal to that of the impeller member, $\Delta Am$ 1st=0 and $\Delta Am$ 2nd>0 wherein ($\Delta Am$) denotes the value of the angular momentum of the fluid per unit time at the exit minus that at the entry of the bladed member named by the suffix, and is influenced among other things by the blade angles and by the radii at the entry and at the exit and by the rate of the fluid flow through the blades and wherein the direction of rotation of the impeller member is assigned a positive sign so that an associated positive value of ($\Delta Am$) will be equivalent to assigning a positive sign to the power when it is fed into the fluid.

2. A power transmitting fluid device as claimed in claim 1, a freewheeling device operably connected between the first bladed member and said gearing, the freewheeling device being so constructed and arranged that if the direction of the torque on the said first bladed member reverses due to the speed ratio of the third bladed member becoming greater than the said specific speed ratio, the first bladed member rotates freely without absorbing any torque load in the reverse direction.

3. A power transmitting fluid device as claimed in claim 2, a driving input shaft, a driven output shaft, the third bladed member being operably connected to the driven output shaft, the first bladed member being designed to work as an impeller member and operably connected to the driving input shaft through the freewheeling device, and the second bladed member also operably connected to the driving input shaft such that the first and the second bladed members rotate in the same direction relative to each other and rotate at constant but unequal speed ratios with respect to the said driving shaft, the speed ratio for the first bladed member being less than that for the second bladed member, so that the portions of the input torque passing into the first and second bladed members are multiplied by constant but unequal factors such that the multiplication factor for the torque passing to the first bladed member is higher than that for the torque passing to the second bladed member.

4. A power transmitting fluid device as claimed in claim 3 wherein the blades of each of the three bladed members are additionally designed and proportioned in such a manner that when the driven shaft and the connected third bladed member are stationary, the relationship for the change of angular momentum of the fluid per unit time effected by the first and second bladed members is defined by the formulae $\Delta Am$ 1st>0 and $\Delta Am$ 2nd is substantially equal to zero, so that when the driven shaft is stationary the major portion of the input torque passes through the said first bladed member and as the speed of the driven shaft increases the proportion of input torque passing through the first bladed member decreases and the proportion of input torque passing through the second member progressively increases, both bladed members transmitting torque until the third bladed member is rotating at the specific speed ratio at which time the input torque passes only through the second bladed member, thus obtaining a continuously variable output torque from zero speed of the driven shaft to its speed corresponding to the said specific speed ratio of the third bladed member.

5. In a power transmitting fluid device as claimed in claim 2, a driving input shaft, a driven output shaft, the second bladed member being operably connected to the driving input shaft, the first bladed member being designed to function as a turbine member and operably connected to the driven output shaft through the freewheeling device, and the third bladed member also operably connected to the driven output shaft such that the first and the third bladed members rotate in the same direction relative to each other and rotate at constant but unequal speed ratios with respect to the said driven shaft, the speed ratio for the first bladed member being more than that for the third bladed member so that the portions of the input torque passing to the output shaft through the first and third bladed members are multiplied by constant but unequal factors such that the multiplication factor for the torque passing through the first bladed member is higher than that for the torque passing through the third bladed member.

6. A power transmitting fluid device as claimed in claim 5 wherein the blades of each of the three bladed members are additionally designed and proportioned in such a manner that when the driven shaft and the connected first and third bladed members are stationary the relationship for the change of angular momentum of the fluid per unit time effected by the first and third bladed members is defined by the formulae $\Delta Am$ 1st $<0$ and $\Delta Am$ 3rd is substantially equal to zero, so that when the said driven shaft is stationary the major portion of the input torque passes through the first bladed member and as the speed of the driven shaft increases the proportion of the input torque passing through the first bladed member decreases and the proportion of the input torque passing through the third bladed member progressively increases, both bladed members transmitting torque until the third member is rotating at the specific speed ratio at which time the input torque passes only through the third bladed member, thus obtaining a continuously variable output torque from zero speed of the driven shaft to its speed corresponding to the said specific speed ratio of the third bladed member.

References Cited by the Examiner
UNITED STATES PATENTS

| | | | |
|---|---|---|---|
| 1,271,079 | 7/1918 | Radcliffe | 60—54 |
| 2,055,895 | 9/1936 | Fawcett | 74—718 |
| 2,238,748 | 4/1941 | Patterson | 60—54 |
| 2,368,711 | 2/1945 | Jandasek | 74—731 |
| 2,592,773 | 4/1952 | Weiss et al. | 74—677 |
| 2,989,004 | 6/1961 | Zeidler et al. | 60—54 |
| 3,025,720 | 3/1962 | Kelley | 60—54 |

DAVID J. WILLIAMOWSKY, *Primary Examiner.*

THOMAS C. PERRY, *Examiner.*